UNITED STATES PATENT OFFICE.

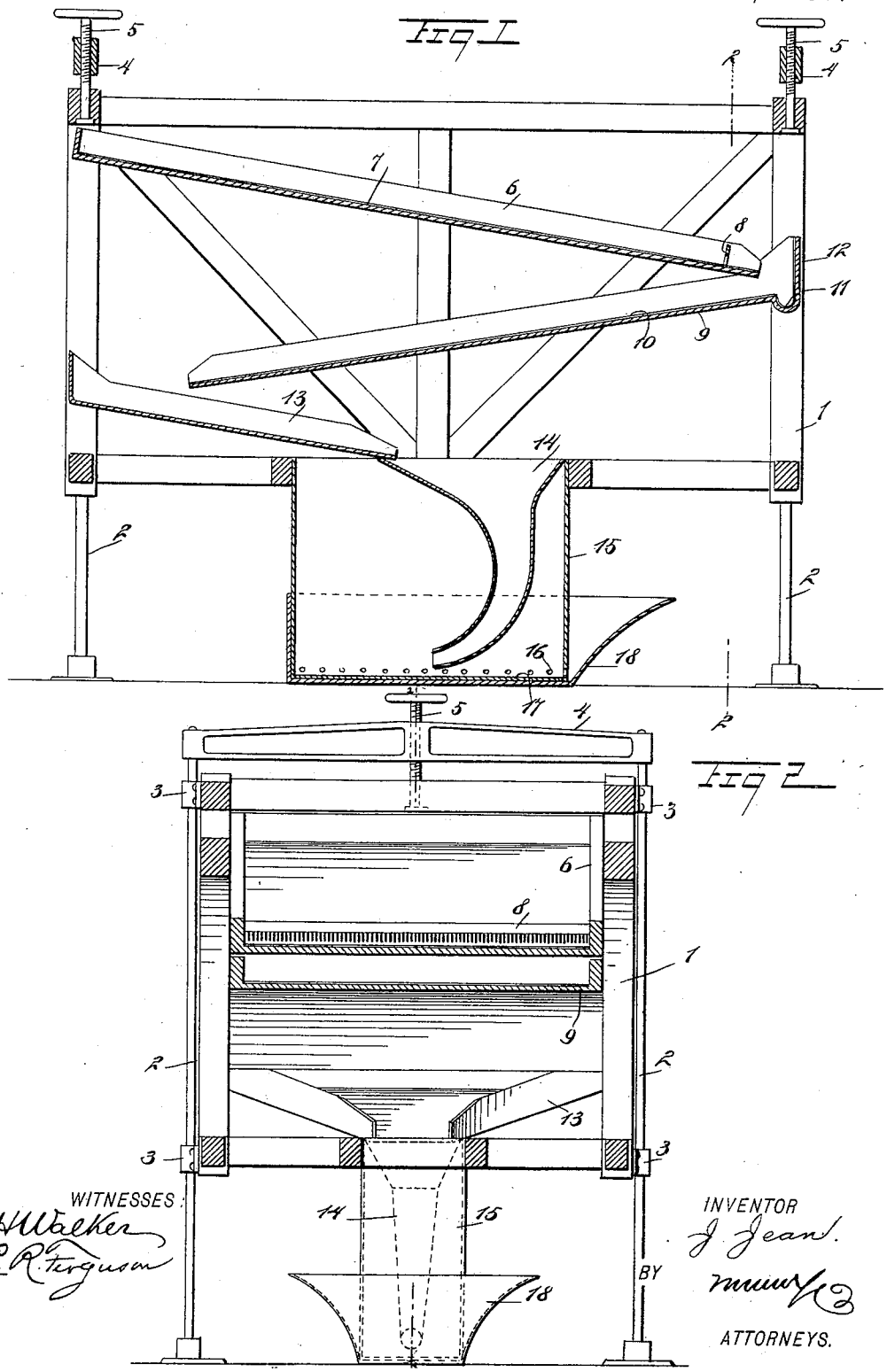

JULIUS JEAN, OF GLOBEVILLE, COLORADO, ASSIGNOR TO THE STANDARD GOLD EXTRACTION COMPANY, OF DENVER, COLORADO.

AMALGAMATOR.

SPECIFICATION forming part of Letters Patent No. 596,370, dated December 28, 1897.

Application filed June 26, 1897. Serial No. 642,414. (No model.)

*To all whom it may concern:*

Be it known that I, JULIUS JEAN, of Globeville, in the county of Arapahoe and State of Colorado, have invented new and useful Improvements in Amalgamators, of which the following is a full, clear, and exact description.

This invention relates to amalgamators for separating precious metals, such as gold and silver, from their ores; and the object is to provide an apparatus of this character that may be operated with comparatively little labor and with which practically all of the metal will be separated from the ore.

I will describe an amalgamator embodying my invention and then point out the novel features in the appended claims.

Reference is to be had to the accompanying drawings, forming a part of this specification, in which similar characters of reference indicate corresponding parts in both views.

Figure 1 is a section on the line 1 1 of Fig. 2, and Fig. 2 is a section on the line 2 2 of Fig. 1.

The amalgamator comprises a frame 1 of suitable material—such, for instance, as wood—and this frame is supported by and vertically adjustable on metal legs 2, one at each corner. The legs 2 extend through bosses 3, secured to the corner-posts of the frame. The two legs at the ends of the frame are connected by a cross-head 4, and a screw 5 passes through a tapped hole in the cross-head and has a swivel engagement with the top cross-bar of the frame. Obviously by manipulating the screws 5 the frame may be raised or lowered, for a purpose to be hereinafter described.

Secured in the frame 1 and extended longitudinally thereof is a trough 6, having a copper plate or lining 7 on its bottom. This trough 6 is arranged at an incline, and near the lower end and extended transversely of the trough is a copper comb 8. The trough 6 discharges into the upper end of a lower inclined trough 9, having a copper plate or lining 10 on its bottom. This trough 9 of course is inclined in an opposite direction to that of the trough 6, and the upper end of the trough 9 has a depression 11, designed to hold mercury. The copper lining or plate 10 will extend around the bottom of this depression and up along the end 12 of the trough.

The trough 9 discharges into an inclined trough 13, which consists of iron, and this trough 13 discharges into a funnel 14, the stem portion of which is longitudinally curved and is contracted at its outlet end. The funnel 14 is supported by the frame 1 and is arranged within a box 15, which is also supported by the frame. This box 15 is open at its top, and near its bottom is a series of outlets 16. On the bottom of this box 15 is a copper plate 17, and it may be here stated that the several copper plates are amalgamated. The box 15 extends at its lower portion into a pan 18, over the top of which the water containing the sand, pulverized ore, &c., is designed to flow.

In operation the pulverized ore, containing the precious metal, after being roasted to discharge its impurities—such, for instance, as arsenic, sulfur, and antimony—will be run into the trough 6 by a suitable supply of water. A portion of the metal will attach itself to the metal plates 7 in the trough 6 while the water is flowing over the same, and fine particles or flour of the metal floating on the top of the water will be caught and retained by the copper comb 8. The water carrying the ore and metal from the trough 6 will discharge into the mercury in the depression 11, which will retain the greater amount of the precious metal. The water and ore flowing through the trough 9 will discharge into the trough 13, and thence into the funnel 14, out of which it will flow into the box 15, where the remainder of the metal will be retained by the mercury in the bottom of the box. By curving the neck of the funnel 14 as shown and contracting its outlet the water containing the material will be discharged with considerable force, and thus keep the water and material and also the mercury in the box 15 in constant agitation. Should the material in the bottom of the box 15 become thick enough to clog the outlet of the funnel 14, the funnel, with the frame and troughs, may be elevated by means of the screws 5.

Having thus described my invention, I claim as new and desire to secure by Letters Patent—

1. An amalgamator comprising a frame, a copper-lined trough secured near the upper part of said frame and provided with a comb near its lower end, said trough being fixed at an inclination, a second copper-lined trough below the first and inclined in the opposite direction, said trough having at its receiving end a depression or cavity for containing mercury, an inclined trough below its discharge end, and a funnel having a curved discharge-spout, mounted on the lower part of the frame within a perforated box, and means for raising and lowering the frame to adjust the funnel in the box, substantially as described.

2. An amalgamator consisting of a frame, mounted to slide on rods at its corners, a crosshead and screw for raising and lowering said frame, an inclined trough extended longitudinally of said frame and lined with copper, a comb at the discharge end of said trough, a second trough disposed below the first and having a depression for containing mercury, a receiving-trough below and a funnel supported by the frame within a box, substantially as described.

JULIUS JEAN.

Witnesses:
FRANK WILLETT,
ADOLPHUS B. CAPRON.